United States Patent [19]

Lewis et al.

[11] Patent Number: 4,483,559
[45] Date of Patent: Nov. 20, 1984

[54] BUMPER BAR FOR A MOTOR VEHICLE

[75] Inventors: Idris Lewis, Ramsden Heath; Roy H. Allen, Dunmow; John E. Roscoe, Leigh-On-Sea; John I. Churchill, Hockley; Ronald A. Parkes, Billericay, all of England

[73] Assignee: Ford Motor Company, Dearborn, Mich.

[21] Appl. No.: 474,991

[22] Filed: Mar. 14, 1983

[30] Foreign Application Priority Data

Apr. 2, 1982 [GB] United Kingdom ............... 8211491

[51] Int. Cl.³ .......................................... B60R 19/02
[52] U.S. Cl. .................................. 293/126; 293/155
[58] Field of Search ............. 293/120, 121, 122, 126, 293/155, 154, 102

[56] References Cited

U.S. PATENT DOCUMENTS 4,095,831 6/1978 Hagiwara ........................... 293/126
4,422,680 12/1983 Goupy ................................. 293/122

FOREIGN PATENT DOCUMENTS 625509 6/1949 United Kingdom .
1068834 5/1967 United Kingdom .
1213696 11/1970 United Kingdom .

Primary Examiner—Robert R. Song
Attorney, Agent, or Firm—Daniel M. Stock; Clifford L. Sadler

[57] ABSTRACT

A bumper bar for a motor vehicle comprises a main body portion 1 of moulded plastics material extending transversely across the motor vehicle and having along at least part of its length two opposed walls 4, 5 connected into a box girder structure, and end portions 2 moulded integrally with the main body portion and projecting from each end thereof to extend along the sides of the vehicle; a first pair of transversely spaced connectors 10 for securing the main body portion 1 to the vehicle; a second pair of connectors 35 for securing respective end portions 2 to the vehicle and each comprising a bracket 36 projecting from the end portion to space the end portion transversely from the vehicle and a fastener 44 for securing the bracket to the vehicle; and a third pair of connectors 56 each for securing a respective end portion 2 to the vehicle and comprising a bracket 61 mounted at a desired level on the vehicle, and a locating part 57 fixed to the end portion 2 and forming a snap engagement with the bracket 61.

10 Claims, 13 Drawing Figures

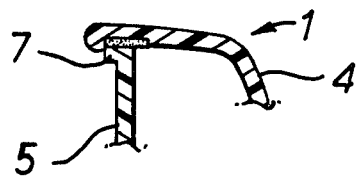
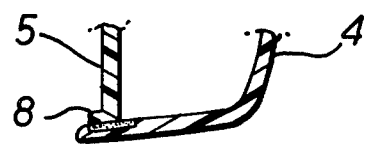
FIG. 3
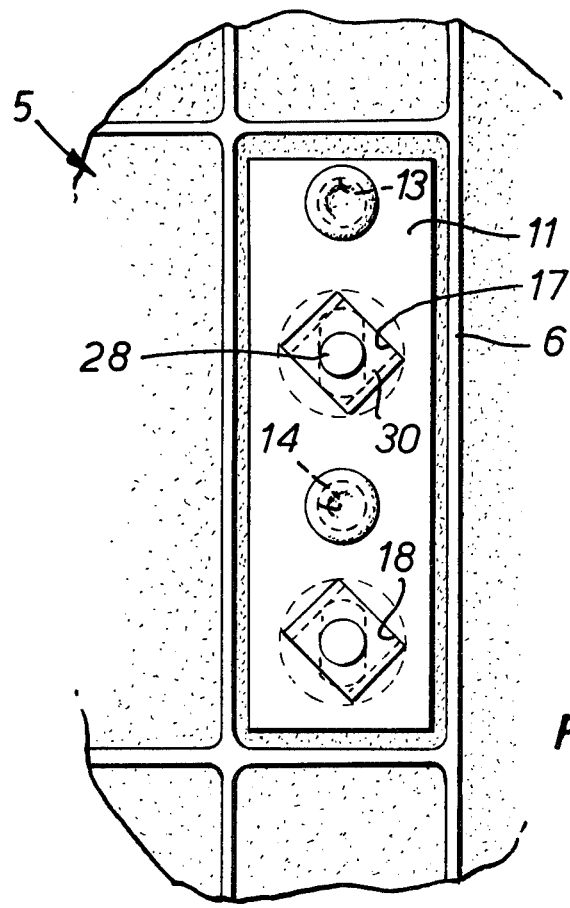
FIG. 5

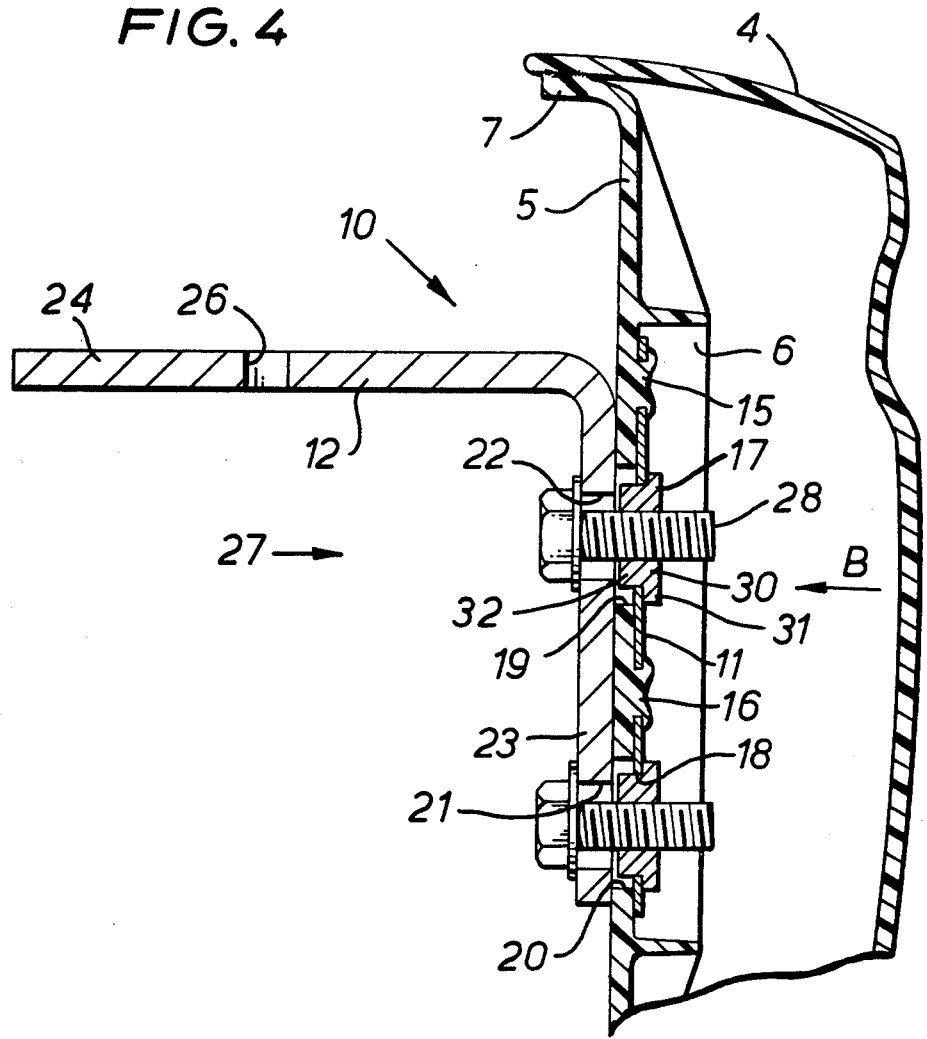

BUMPER BAR FOR A MOTOR VEHICLE

BACKGROUND OF THE INVENTION

This invention relates to bumper bars for motor vehicles.

German Utility Model No. 68105652.4 discloses a bumper bar for a motor vehicle comprising a main body portion of moulded plastics material for extending transversely across the motor vehicle and end portions moulded integrally with the main body portion and projecting from each end thereof for extending along the sides of the motor vehicle. The main body portion and the end portions have two opposed walls connected together along the whole length of the bumper to form a rigid box girder structure.

Although the box girder construction provides the bumper bar with rigidity, the bumper bars are more flexible than conventional metal bumper bars, and a problem arises in securing the bumper bar accurately onto the vehicle body during assembly. This problem is particularly acute where, for reasons of appearance or manufacturing convenience, it is desired to form the end portions of the bumper bar not as box girder structures, but from single walls of plastics material.

SUMMARY OF THE INVENTION

According to the present invention, there is provided a bumper bar for a motor vehicle comprising a main body portion of moulded plastics material for extending transversely across the motor vehicle and having, along at least part of its length, two opposed walls connected into a box girder structure and end portions moulded integrally with the main body portion and projecting from each end thereof for extending along the sides of the motor vehicle, and means for releasably connecting the bumper bar to a motor vehicle body characterized in that the means for releasably connecting the bumper bar to the motor vehicle body comprises a first pair of transversely-spaced connectors for securing the main body portion to the motor vehicle, a second pair of connectors each for securing respective end portions to the motor vehicle, and each comprising a bracket projecting from the wall of a respective end portion for spacing the end portion transversely from the vehicle and a fastener for securing the bracket to the vehicle body, and a third pair of connectors each for securing a respective end portion to the motor vehicle body, and comprising a bracket adapted to be mounted at a desired vertical level on the vehicle body and a locating part fixed to the end portion and forms a snap engagement with the bracket.

By securing the end portions to the motor vehicle by two connectors, one of which provides the desired transverse spacing between the motor vehicle and the end portion, the other of which provides the desired vertical height of the end portion, the bumper bar can be mounted accurately on the motor vehicle.

In the preferred embodiment of the invention, the bracket of the second connector comprises a wall having an outer surface for abutment with a body panel of a motor vehicle, and having an aperture therethrough, and a cam surface surrounding the aperture of the inner surface of the wall, and the fastener comprises a bolt having a head at one end for engaging the inner surface of the body panel, a shank for projecting through an aperture in the body panel, and through the aperture in the wall of the bracket, and projections extending radially from the end of the shank opposite the head for engagement with the cam surface, the cam surface being so shaped that rotation of the bolt in one direction moves the bolt axially toward the head.

The head preferably includes a resiliently deformable flange which forms a spring washer for biasing the bolt axially away from the bracket.

The bracket and the fastener are preferably formed of plastics material.

In the preferred embodiment of the invention, the locating parts of the third pair of connectors each comprise a stud having a shank connected at one end to the end portion of the bumper bar and projecting therefrom toward the motor vehicle body, and a head of larger diameter than the shank formed on the other end of the shank, and the brackets each comprise means for slidingly receiving the head of the locating part so that the locating part can be assembled into the bracket by a simple sliding operation.

In one suitable construction, the brackets each comprise two opposed channels mounted on the support for embracing opposite sides of the head and preventing movement of the stud in the axial direction, the channels being open at one end and terminating in end walls at the other end to permit radial sliding movement of the head along the channels, the channels being shaped to form a resiliently deformable construction which resists such movement of the head.

In order to secure the brackets to an aperture in a body panel of the motor vehicle, the support preferably carries a mounting element comprising a shank which terminates in a noncircular flange which is shaped to fit in the aperture, which is of complementary noncircular shape. Rotation of the bracket in the aperture will secure it to the body panel.

The brackets and locating parts of the third pair of connectors are also preferably formed from plastics material.

BRIEF DESCRIPTION OF THE DRAWINGS

A preferred embodiment of the invention will now be described, by way of example only, with reference to the accompanying drawings, in which:

FIG. 3 is a schematic vertical cross section of the bumper taken along lines III—III of FIG. 2;

FIG. 4 is a vertical cross section along line IV—IV of FIG. 2 showing a first connector for the bumper bar;

FIG. 5 is a view of the interior of the bumper bar in the direction of the arrow B in FIG. 4;

DESCRIPTION OF A PREFERRED EMBODIMENT

Figure 1:
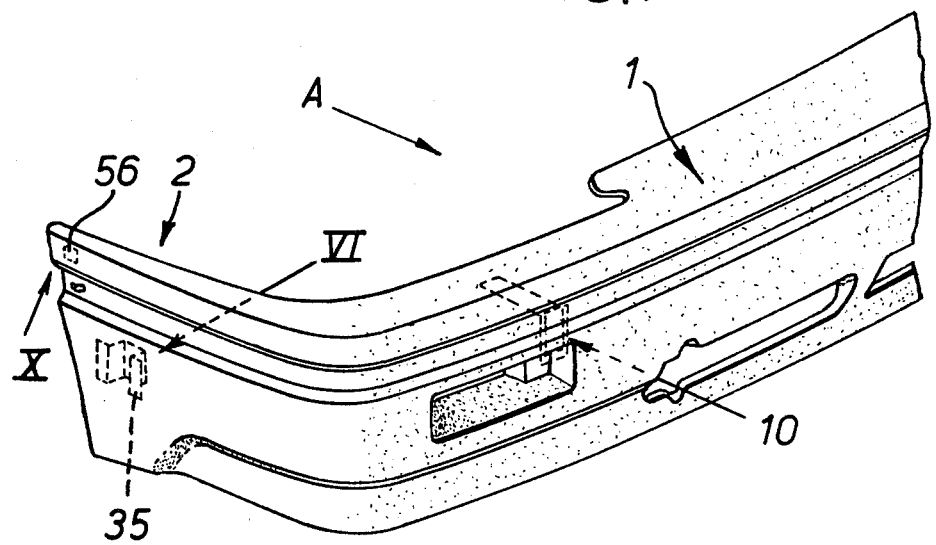
FIG. 1 is a perspective view of part of a bumper bar in accordance with the invention.
Figure 2:
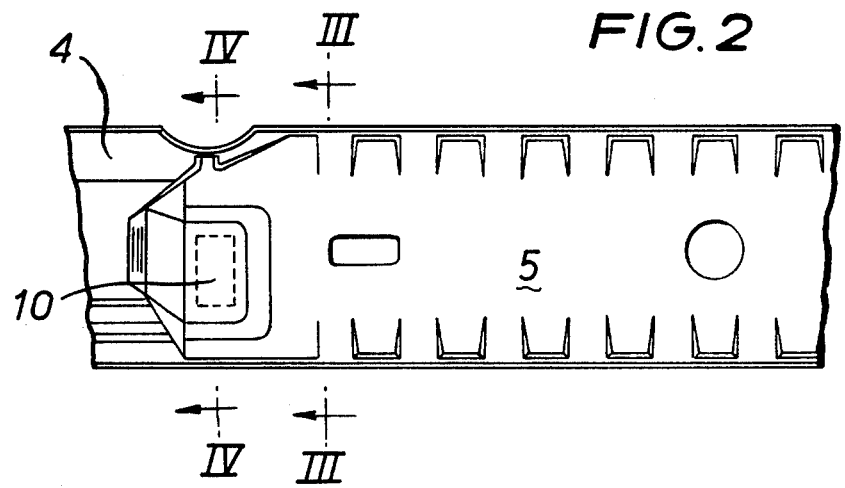
FIG. 2 is a view of part of the bumper bar of FIG. 1 taken in the direction of the arrow A in FIG. 1.
Figure 6:
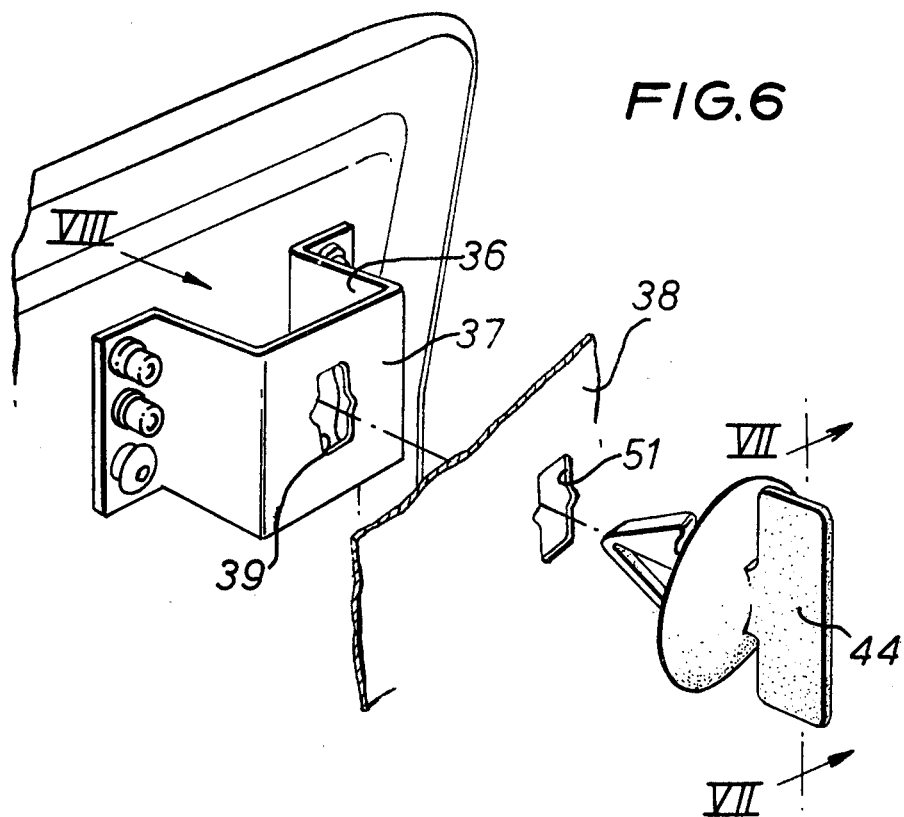
FIG. 6 is an "exploded" perspective view of that part of the bumper bar indicated by the arrow VI in FIG. 1.

Referring to FIGS. 1 to 3 of the drawings, a rear bumper bar for a motor vehicle comprises a main body portion 1 of moulded plastics material which, in use, extends transversely across the motor vehicle, and two similar end portions, one of which is indicated at 2, moulded integrally with the main body portion 1 and projecting forwardly therefrom to lie along the sides of the motor vehicle.

As best seen in FIG. 3, the main body portion 1 comprises two opposed walls which will be referred to as the main wall 4, and the supporting wall 5 connected together to form a box girder structure. The main wall 4 is generally channel-shaped and extends across the whole with the main body portion 1 and also forms the end portions 2. The supporting wall 5 extends along only the central part of the main body portion 1. It is generally flat with stiffening ribs on its inside surface, as seen at 6 in FIG. 5. The upper and lower edges of the supporting wall 5 include flanges 7, 8, which abut the inner faces of the main wall 4 and are connected thereto, for example, by friction welding, or any other suitable technique.

The bumper bar is releasably connected to the motor vehicle by three pairs of connectors. The first pair of connectors are spaced transversely from each other on the main body portion 1. The position of one of these connectors 10 is indicated in broken lines in FIGS. 1 and 2. Since both connectors are similar in construction, only one connector 10 will be described in detail, with reference to FIGS. 4 and 5.

The connector 10 comprises two clamping elements formed respectively by a rectangular metal plate 11 and an L-shaped metal bracket 12. The plate 11 lies in contact with the inner side of the supporting wall 5 in a recess formed by the ribs 6. The plate 11 includes two holes 13, 14 (FIG. 5) through which project stakes 15, 16 of the plastics material from which the supporting wall 5 is formed. The stakes 15, 16 are turned over by the application of heat to secure the plate 11 permanently to the supporting wall 5. Two rectangular apertures 17, 18 in the plate 11 are aligned with two circular apertures 19, 20 in the supporting wall 5, and with two further elongated apertures 21, 22 in one limb 23 of the bracket 12. The other limb 24 of the bracket 12 is provided with a bolt hole 26 by which it can be attached to the motor vehicle body.

The plate and the bracket are held together by two fasteners in the form of nuts and bolts. Since the fasteners are identical, only one, indicated generally at 27, will be described. The fastener 27 comprises a bolt 28, the head of which engages the bracket 12 and the threaded shank of which passes through the apertures 22, 19, 17 in the bracket 12, supporting wall 5 and plate 11. A rectangular pierce nut 30 threaded onto the bolt 28 has a flange 31 which engages the inner surface of the plate 11 and a body 32 of smaller rectangular cross section than the flange 31 which is a press-fit in the aperture 17 and which projects through and beyond the aperture by a distance marginally less than the thickness of the supporting wall 5. As the bolts 28 are tightened into the pierce nuts 30, a clamping force is exerted on the bracket 12 and the plate 11 which secures the bracket 12 to the supporting wall 5. The maximum compressive force exerted on the supporting wall 5 is reached when the body 32 of the pierce nut 30 engages the bracket 12. In this condition, metal-to-metal contact is established between the two parts of the fasteners, and the maximum clamping force thus established is applied to the supporting wall 5 over the relatively large areas of the plate 11 and bracket 12. Consequently, the plastics material of the supporting wall 5 is less susceptible to failure under stresses inclined by vibrations.

The second pair of connectors is provided for securing the respective end portions 2 of the bumper bar to the vehicle body and for spacing the end portions 2 therefrom by a desired distance. The second pair of connectors are attached to the end portions 2 as indicated by the arrow VI in FIG. 1. Since the two connectors are identical, only one, indicated generally at 35, will be described in detail, with reference to FIGS. 6 to 9.

The connector 35 comprises a U-shaped bracket 36 of plastics material, the sides of which terminate in flanges which are heat-staked to the inner surface of the supporting wall 5 in a manner similar to the plate 11. The outer surface of the bottom wall 37 of the bracket abuts a body panel 38 of the motor vehicle so that the bracket 36 spaces the end portion 2 of the bumper bar laterally from the vehicle by the required amount.

Figure 8:
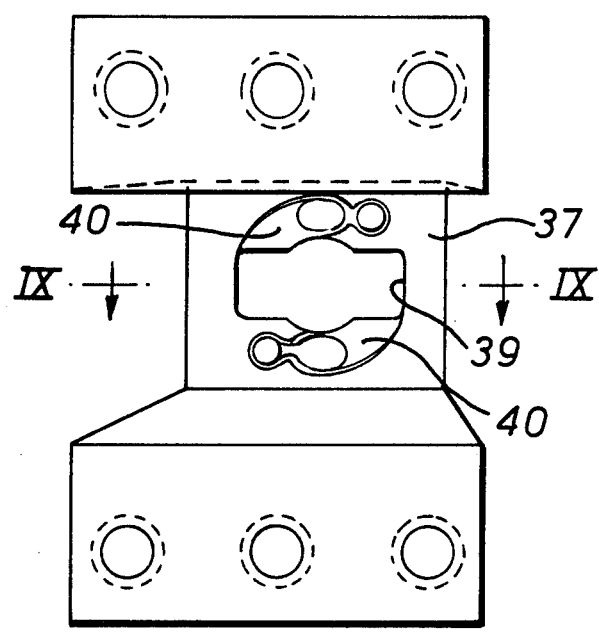
FIG. 8 is a view of part of the bumper bar in the direction of the arrow VIII in FIG. 6.
Figure 9:
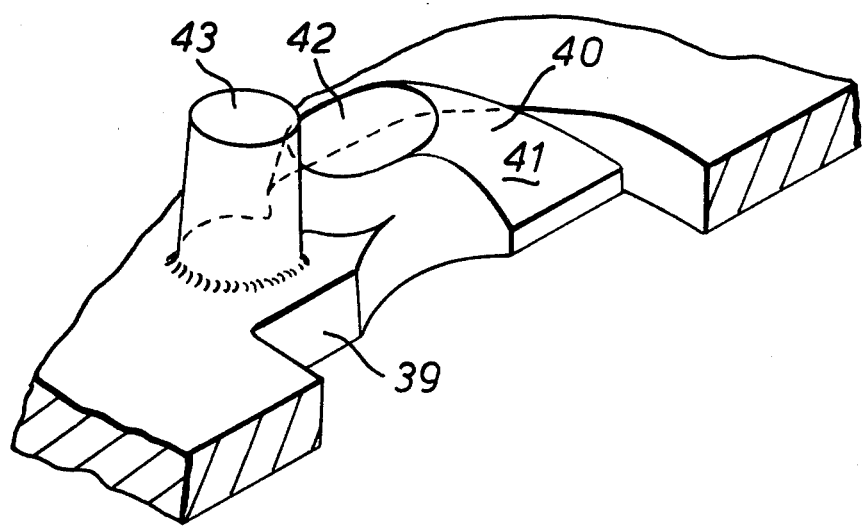
FIG. 9 is a perspective view, partly in section and on an enlarged scale, along the line IX—IX of FIG. 8.

The bottom wall 37 of the bracket 36 includes an aperture 39, and, as best seen in FIGS. 8 and 9, the inner surface of the wall 37 is provided by two similar integrally moulded cam surfaces 40, 40 around the aperture 39, each of which includes a ramp 41 which leads up to a recess 42. A peg 43 projects from the wall adjacent the recess 42 to act as a stop.

Figure 7:
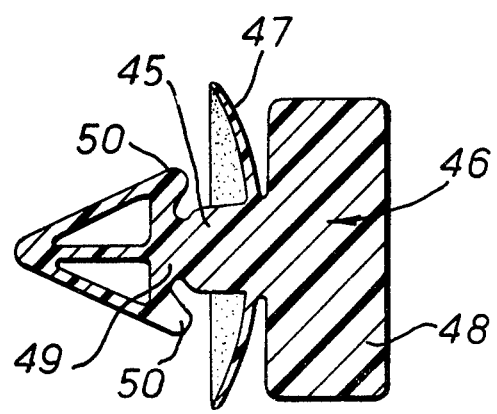
FIG. 7 is a cross section along line VII—VII of FIG. 6.

The bracket 36 is secured to the body panel 38 by a fastener 44 which is also composed of plastics material. As best seen in FIG. 7 the fastener 44 includes a bolt 45 having a head 46 at one end which includes a resiliently deformable flange 47 and a finger grip 48 which enables the fastener to be manipulated. A shank 49 extends from the head of the fastener and includes radial projections 50, 50 which are shaped and positioned to engage with the cam surfaces 40 on the bracket 36.

The end portions 2 of the bumper bar are connected to the body panel 38 by aligning the aperture 39 in the bottom wall 37 of the bracket with a corresponding aperture 51 in the body panel 38, inserting the shank 49 of the fastener 44 through both apertures, and rotating the fastener 44 through 90° until the radial projections 50 engage in the recesses 42 on the cam surfaces. The axial movement of the fastener 44 produced as a result of the movement of the radial projections up the ramps 41 is resisted by the flange 47, thereby generating a positive retaining force in the connector.

The third pair of connectors is provided for securing the respective end portions 2 of the bumper bar and for positioning the terminal end portions of the bumper bar at a desired vertical height on the body panel 38.

The third pair of connectors are attached to the end portions 2 in the positions indicated by the arrow X in FIG. 1. Since the third pair of connectors are identical, only one, indicated generally at 56 will be described, with reference to FIGS. 10 to 13.

The connector 56 comprises a locating part in the form of a stud 57 of plastics material having a shank heat sealed into boss 59 of plastics material formed integrally with the supporting wall 5. A disc shaped head 60 of larger diameter is formed on the free end of the shank.

The head 60 of the stud 57 is received in a bracket 61 of plastics material which is, in turn, mounted in the body panel 38 at a required height.

Figure 10:
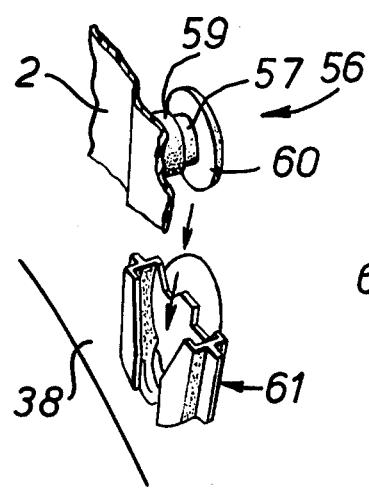
FIG. 10 is an "exploded" perspective view of that part of the bumper bar indicated by the arrow X in FIG. 1 illustrating a connector.
Figure 11:
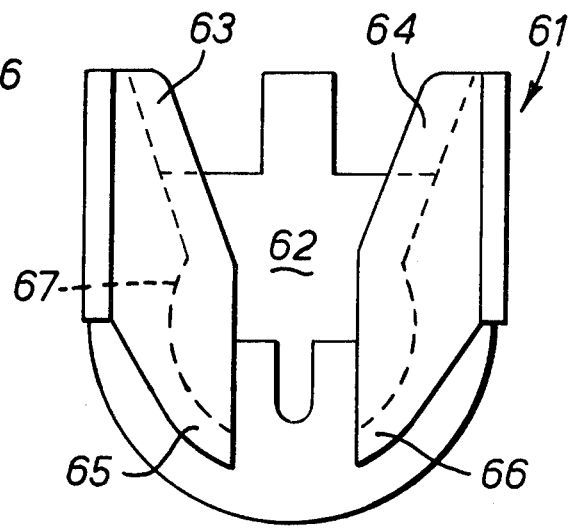
FIGS. 11, 12 and 13 are front, side and rear views, respectively, of part of the connector of FIG. 10.
Figure 12:
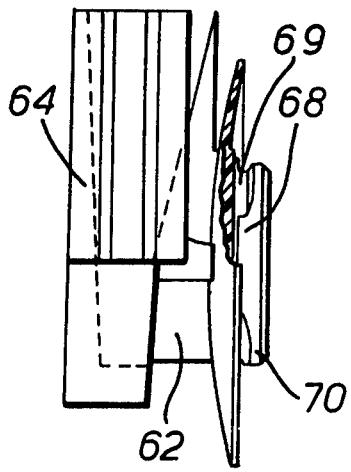
Figure 13:
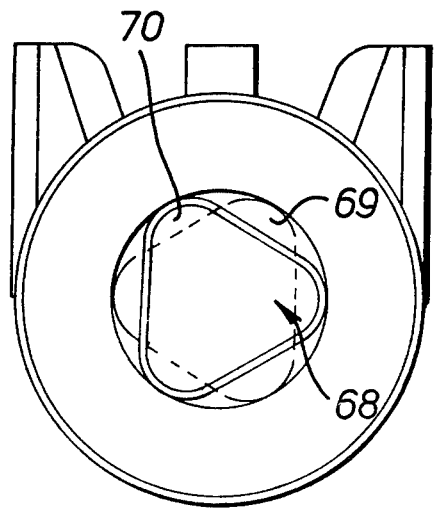

As best seen in FIGS. 11 to 13, the bracket 61 comprises a body 62 carrying, on one side, two opposed channels 63, 64 for embracing opposite sides of the head 60 of the stud 57 so that the head 60 can slide along the channels in the radial direction (as indicated in FIG. 10), but once engaged therewith, cannot move in the axial direction. The channels, which are open at one end, terminate in end walls 65, 66 of complementary shape to the head 60 and are also shaped to form a resiliently deformable constriction 67 which resists the radial movement of the head 60 along the channels 63, 64 so that the bracket forms a snap engagement with the stud.

The other side of the body 62 carries an integral mounting element 68 in the form of a stud having a body portion 69 of rounded triangular cross section and a flange portion 70 of identical shape but disposed in a different radial orientation so that the sides of the stud 69 undercut the rounded apices of the flange, as illustrated in FIGS. 12 and 13. The axial depth of the flange is equal to the thickness of the body panel 38. The bracket 61 is secured to the body panel 38 by inserting the flange 70 into an aperture of complementary shape in the body panel and rotating the bracket through 60° so that the apices of the flange locate behind the panel 38 and the edges of the aperture in the panel 38 cut into the plastics material forming the apices of the body portion 69, thereby preventing the bracket 36 from moving. The head 60 of the stud 57 is then inserted into the bracket 61, as indicated in the arrow in FIG. 10.

The bumper bar may therefore be mounted on the vehicle quickly and easily, with the side portions positioned accurately. Moreover, the connections between the bumper bar and the vehicle are resistant to vibrations during use. Should the bumper bar become damaged, it can easily be removed and replaced.

We claim:

1. A bumper bar for a motor vehicle comprising a main body portion of moulded plastics material for extending transversely across the motor vehicle and having, along at least part of its length, two opposed walls connected into a box girder structure and end portions moulded integrally with the main body portion and projecting from each end thereof for extending along the sides of the motor vehicle, and means for releasably connecting the bumper bar to a motor vehicle body characterized in that the means for releasably connecting the bumper bar to the motor vehicle body comprises a first pair of transversely spaced connectors for securing the main body portion to the motor vehicle, a second pair of connectors each for securing respective end portions to the motor vehicle, and each comprising a bracket projecting from the wall of a respective end portion for spacing the end portion transversely from the vehicle, the bracket including a wall having an outer surface for abutment with the motor vehicle body and having an aperture therethrough and a cam surface adjacent the aperture on the inner surface of the wall, and a fastener for securing the bracket to the vehicle body comprising a bolt having a head at one end for engaging the inner surface of a body panel to which the end portion is to be attached, a shank for projecting through an aperture in the body panel and the aperture in the wall and the rest of the bracket, and projections extending radially from the end of the shank opposite the head for engagement with the cam surface, the cam surface being so shaped that rotation of the bolt in one direction moves the bracket axially toward the head, and a third pair of connectors each for securing a respective end portion to the motor vehicle body, and comprising a bracket adapted to be mounted at a desired vertical level on the vehicle body and a locating part fixed to the end portion and forming a snap engagement with the bracket.

2. A bumper bar according to claim 1, wherein the head comprises a resiliently deformable flange.

3. A bumper bar according to claim 1, wherein the bracket and the fastener are formed of plastics material.

4. A bumper bar according to claim 2, wherein the bracket and the fastener are formed of plastics material.

5. A bumper bar according to claim 1, wherein the locating parts of the third pair of connectors each comprise a stud having a shank connected at one end of the end portion and projecting laterally therefrom, and a head on the other end of the shank, and the brackets each comprise means for slidingly receiving the head.

6. A bumper bar according to claim 5, wherein each bracket comprises a body and two opposed channels mounted on the support for embracing opposite sides of the head and preventing movement of the stud in the axial direction relative to the bracket, the channels being open at one end and terminating in end walls at the other end to permit radial movement of the head along the channels, the channels being shaped to form a resiliently deformable construction which resists the movement of the head therealong.

7. A bumper bar according to claim 5, wherein the body carries a mounting element comprising a shank and a noncircular flange adapted to fit into a similarly noncircular aperture in a body panel of the motor vehicle.

8. A bumper bar according to claim 7, wherein the brackets and the locating parts of the third pair of connectors are composed of plastics material.

9. A bumper bar for a motor vehicle comprising a main body portion of moulded plastics material for extending transversely across the motor vehicle and having, along at least part of its length, two opposed walls connected into a box girder structure and end portions moulded integrally with the main body portion and projecting from each end thereof for extending along the sides of the motor vehicle, and means for releasably connecting the bumper bar to a motor vehicle body characterized in that the means for releasably connecting the bumper bar to the motor vehicle body comprises a first pair of transversely spaced connectors for securing the main body portion to the motor vehicle, a second pair of connectors each for securing respective end portions to the motor vehicle, and each comprising a bracket projecting from the wall of a respective end portion for spacing the end portion transversely from the vehicle and a fastener for securing the bracket to the vehicle body, and a third pair of connectors each for securing a respective end portion to the motor vehicle body, and comprising a bracket adapted to be mounted at a desired vertical level on the vehicle body and a locating part fixed to the end portion and forming a snap engagement with the bracket, the locating part comprising a stud having a shank connected at one end of the end portion and projecting laterally therefrom, and a head on the other end of the shank, and the brackets each comprise means for slidingly receiving the head, and wherein the body carries a mounting element comprising a shank and a noncircular flange adapted to fit into a similarly noncircular aperture in a body panel of the motor vehicle.

10. A bumper bar according to claim 9, wherein the brackets and the locating parts of the third pair of connectors are composed of plastics material.

* * * * *